No. 630,085. J. A. MAIGNEN. Patented Aug. 1, 1899.
FILTER.
(Application filed Apr. 26, 1898.)
(No Model.)
Fig: 1.
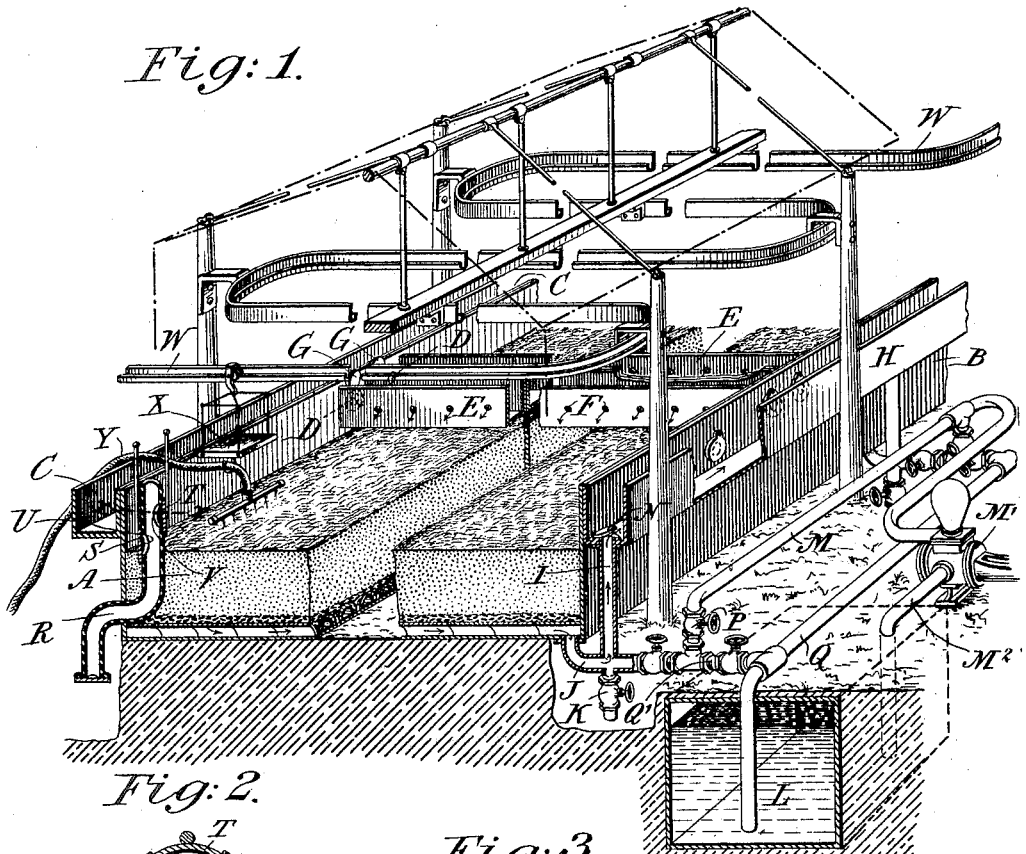
Fig: 2.
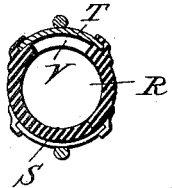
Fig: 3.
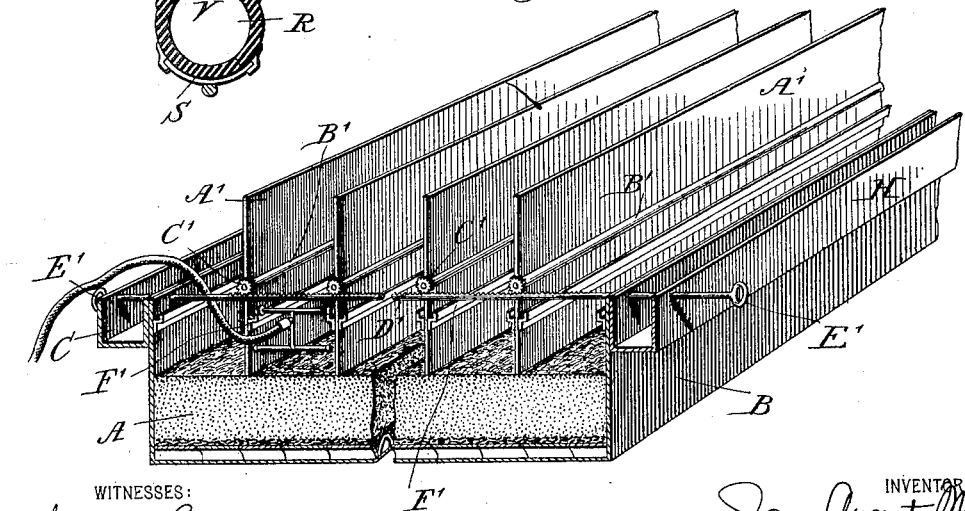
WITNESSES:
John A. Rennie
P. H. Lagles
INVENTOR
Jean Auguste Maignen,
BY
Diedersheim & Fairbanks
ATTORNEYS
THE NORRIS PETERS CO., PHOTO-LITHO., WASHINGTON, D. C.

UNITED STATES PATENT OFFICE.

JEAN AUGUSTE MAIGNEN, OF PHILADELPHIA, PENNSYLVANIA.

FILTER.

SPECIFICATION forming part of Letters Patent No. 630,085, dated August 1, 1899.

Application filed April 26, 1898. Serial No. 678,852. (No model.)

*To all whom it may concern:*

Be it known that I, JEAN AUGUSTE MAIGNEN, a citizen of France, residing in the city and county of Philadelphia, State of Pennsylvania, have invented a new and useful Improvement in Filters, which improvement is fully set forth in the following specification and accompanying drawings.

My invention relates to certain improvements in filters wherein the filtering materials are disposed in layers, as in the so-called "natural" sand filters or in the so-called "mechanical" filters, in which the water passes through sand beds or other beds of granular material, the object being to provide in a filter of this character an artificial or inorganic filtering-membrane on the surface of the layers thereof for the protection of the same, thereby attaining better and quicker purification of the water and easier and more economical removal of the sediment.

The invention also provides means whereby the materials composing the said artificial filtering-membrane may be automatically and evenly distributed all over the filter-bed and protected from disturbance by the avoidance of extreme and local currents.

The invention contemplates also the use of novel and effective means for conveniently removing the said artificial filtering-membrane and sediment arrested thereon, cleansing the surface of the beds, and economically sterilizing the whole body of the filtering materials.

In existing sand beds the impurities suspended in the water form what is called a "natural" filtering-membrane, and until this membrane has acquired a certain thickness the water is considered imperfectly filtered and is allowed to go to waste, and as it passes through the underlying strata in this imperfectly-purified state it leaves therein a portion of its impurities, which may afterward soil the filtering-water. The mud resting directly on and in the sand, a great quantity of the latter has to be removed to separate the two by washings. Hence a great deal of labor.

In mechanical sand filters the whole sand is more or less stirred and mixed up with the mud. Hence a great waste of power and in some cases of filtered water.

In the old filters the speed of filtration is regulated by an outlet-valve at the lower part of the beds. This valve is at first slightly opened and afterward opened a little more every now and then, according to the increasing thickness of the mud deposit. A mistake on the part of the workman who attends to this valve may have most disastrous effects. If he opens it too much, there is a rush through, which creates cracks and fissures and fouls the filtrate and the bed itself for several days. This interference with the natural flow of the water through the filter during its working period is a most grave error.

My invention provides in lieu of the natural muddy filtering-membrane an artificial or inorganic filtering-membrane composed of asbestos fibers or other fibers, or pulp or powdered asbestos, powdered coke, powdered charcoal, powdered clinker, or a mixture of these or analogous fibrous, powdered, or insoluble materials of such size and density as to be carried in by the water going into the filter or otherwise deposited in an even and regular manner all over the filtering-surface in any convenient manner, the effect of which is that the mud will be retained upon the surface of the inorganic filtering-membrane and its penetration into and consequent fouling of the sand or other filtering material beneath it is prevented.

The invention further consists in the novel features of construction and arrangement of parts, all as will be hereinafter fully described, and pointed out in the claims.

Figure 1 represents a sectional perspective view of a filter having my invention applied thereto. Fig. 2 represents a transverse section taken on the line $x\,x$ of Fig. 1. Fig. 3 represents a sectional perspective view of a modified form of filter to be described.

Similar letters of reference indicate corresponding parts in the figures.

Referring to the drawings, A designates a filter-bed composed of sand or other suitable filtering material, which is ararnged in layers upon suitable foundations, the whole being contained within an inclosure B of any desired character.

C designates a trough located at one side of the exterior of the outside walls or inclosure B, the said trough constituting the inlet for the water, which passes through orifices D into transversely-arranged troughs E, where it discharges itself through the perforations F, located in the side walls of the said transverse troughs, into the filter-bed in an even and gradual manner. The orifices D are provided with doors or valves G, whereby communication between the troughs C and E may be temporarily shut off when desired.

The troughs E are arranged at convenient intervals apart throughout the entire filtering-surface, preferably in pairs, as shown, and beneath each pair of troughs is located a partition or divisional wall, which extends up from the bottom of the filter, and thus serves to divide the filter up into sections.

Instead of the troughs E just described I may substitute a rectangular or other coil of pipes, or I may arrange pipes diagonally across the filter or in any other manner in order that an even distribution of the water over the entire surface of the filter will result.

H designates a trough located at the opposite side of the inclosure B and communicating through the pipes I and J with the interior of the bottom of the inclosure, as clearly shown, through which latter the filtered water passes into the said trough H, from whence it may be carried away.

The filtering material destined to form the artificial membrane may be of asbestos fibers, paper fibers, wood fibers, or mineral fibers, or powdered asbestos or pulverized coke, clinker, charcoal, stone, stoneware debris, or any mineral and of such size and density as to be easily carried in suspension in the water and to spread itself easily over the sandy or other granular filtering-bed A, where it forms a substantial and effective filtering-membrane. The filtering-membrane having been properly formed, the water will pass therethrough and down through the sand or granular layers, out through the pipes J and I, into the trough H, as before described, and the pipe J is provided with a gate or valve K, which may be opened to discharge some of the water in order to test the quality of the filtrate before it is permitted to rise up into the trough H.

L designates a receptacle or reservoir which is located in convenient proximity to the inclosure B and preferably, but not necessarily, beneath the ground, the same being provided with a pipe M, one end of which is adapted to connect with the pipe J, while the other end connects with a suitable pump M', by means of which the sterilizing liquid is raised from the reservoir through a pipe $M^2$, which connects therewith, from whence it passes into the filter. During this operation a gate or valve N, located at the upper end of the pipe I, which during the process of filtration remains open, will be closed, and the sterilizing liquid after filling the filter is allowed to remain therein the time necessary for saturating and sterilizing it, after which it may be permitted to escape through the pipe J or at any other convenient place to the said receptacle L, whence it may be taken for sterilizing other sections of the filter. A governing-valve P is arranged upon said pipe M to regulate the supply of sterilizing liquid, as well as to shut off communication between the reservoir and filter when desired or necessary.

Q designates a pipe which leads from the receptacle or reservoir L and connects with the filter by the branch pipe Q', through which latter the sterilizing liquid, having been used to sterilize one section of the filter, as described, may be allowed to drain into the reservoir, from whence it may be raised by said pump and introduced into the next succeeding section to sterilize it, which operation is repeated until the entire filter has been thoroughly and economically sterilized, as will be evident. Valves are also arranged upon these branch pipes Q' for the purpose of controlling and properly directing the sterilizing liquid to accomplish the desired effect, as will be understood.

R designates washout or overflow pipes, which may be arranged in any desired number and location throughout the filtering-bed A, each being provided at or near its upper extremity with two valves S T, adapted to cover orifices U V, of which the former is arranged on a level plane with the top of the filter-bed, the latter somewhat above it. The valves are closed during the process of filtration, but are opened one after the other while the bed is being cleansed in order that the muddy sediment which has accumulated upon the surface of the filtering-membrane—in fact, the inorganic membrane itself—may pass out through said orifices into some convenient receptacle, where it may be washed and afterward used again upon the filter-bed in a similar manner to that first described, it being evident, of course, that the lighter particles will rise and pass out through the upper orifice while the washing goes on. The lower orifice serves to drain the last of the floating matter.

The removal of the artificial membrane and the cleansing of the filter are operated by a strong jet or stream of water upon the surface, and to accomplish this I may arrange a suitable superstructure over and around the inclosure B, from which I suspend a circuitous or other track W, extending over the whole area of the filter and upon which a carriage X travels, being adapted to seat and carry an attendant who, being supplied with a hose Y, applies water to the surface.

The operation of cleansing is substantially as follows: The gates G having been closed to prevent the inflow of the unfiltered water and the gates N being partly opened, the filtered water contained in the outlet-trough H will flow back through the pipes I and J, entering beneath the filter-bed, and the water rises slowly through the sand or other granular bed. At that particular time the hose under pressure is made to play on the artificial membrane, which is then loosened and made to pass through the orifices U and V of the pipe or pipes R, which have been previously uncovered, and from thence conducted to any suitable receptacle, as previously stated.

In Fig. 3 I have shown a modified form of washing or cleansing attachment wherein the inclosure B is provided with a plurality of revolubly-arranged partitions A', each of which is carried by a shaft B', suitably journaled, the outer end being provided with a cog-gear C', the teeth of which engage the teeth of a transversely-arranged rack D', the latter extending beyond the outside of the troughs C and H, where its terminals are formed into handles E', by which the said partitions may be opened or closed. It is evident, however, that these handles may be omitted and any suitable mechanical device substituted therefor. The partitions are further provided on each side with rails F', upon which a traveling hose-carriage moves and throws water over the surface of the filtering-membrane between the partitions, thus cleansing the surface of the filter in sections, as will be obvious. The sides of the inclosure are also provided upon the interior thereof with corresponding rails, so that the hose-carriage may be used to cleanse the space between the sides and the first or last partition, as the case may be. A manipulation of the rack D' to the left will serve to rotate the partitions A' and, closing one upon the other, form a substantial covering against the entrance of leaves, dust, or other foreign elements into the filter-bed, as well as protection against the heat of the sun.

The relative level of the filtered and unfiltered water is arranged to be never superior to one foot six inches while in working order.

It will thus be seen that my invention provides in a comparatively simple and inexpensive manner a filter which is particularly well adapted for the purposes intended, which by reason of the filtering-membrane being formed in a very short space of time permits of the filtered water being used, practically, at once without waste, the maximum speed being attained and the filtration going on without any mechanical interference during the working period. It is also obvious that the cleansing and sterilizing operations are both efficacious and economical, while the filtration is such as to insure thorough purification of the water. It is evident that the superstructure shown in Fig. 1 may be covered, as shown in dotted lines, to preclude the elements.

Although I have herein described and shown the inclosure as a thin rectangular body, it will be understood that my invention will apply to circular filters and to inclosures whose walls may be of varying thickness, and it is also apparent that the artificial or inorganic membrane may be deposited on any of the existing mechanical filters, as well as on open slow sand filtering-beds.

The open troughs may also be omitted and pipes substituted therefor, in which event the same will be provided with any ordinary or suitable valves, and although I have described one particular way of removing the artificial filtering-membrane it is obvious that the same may be allowed to dry and then be removed by rolling it upon itself, an operation which is particularly easy and applied to cases where asbestos or other fibers are used alone or in combination with powdered materials, as will be understood.

The rails W and partitions A' and their adjuncts may be entirely dispensed with, and instead suitable trolley-wires may be strung over the surface upon which the hose-carriage will travel to and fro during the process of washing.

Having thus described my invention, what I claim as new, and desire to secure by Letters Patent, is—

1. In a filter for the purpose described, the artificial or inorganic filtering-membrane composed of asbestos or other fiber, pulp or asbestos powder, powdered or pulverized coke, clinker or analogous material, said membrane being adapted to be carried, distributed and deposited by the water above the filter-bed over the surface of the latter.

2. In a filter for the purpose described, the artificial or inorganic filtering-membrane composed of asbestos or other fiber, pulp or asbestos powder, powdered or pulverized coke, clinker or analogous material, said membrane being adapted to be carried, distributed and deposited by the water above the filter-bed over the surface of the latter and means for sterilizing and cleansing the filter.

3. A filter for the purposes described, comprising a filter of sand or other granular material, a filtering-membrane composed of asbestos or other fiber, pulp or asbestos powder or powdered or pulverized coke, clinker or analogous material, perforated troughs or pipes arranged above the filter-bed through which the incoming water is admitted to the filter and evenly distributed over the entire surface thereof.

4. A filter for the purposes described comprising sand or other granular layers, an inclosure for the same, an inlet for the incoming water, suitably-arranged perforated troughs or pipes communicating with the said inlet and an artificial or inorganic filtering-membrane composed of asbestos or other fiber, pulp or asbestos powder, or powdered or pulverized coke, clinker or analogous material of such size and density as to commingle with and be carried by the water and uniformly distributed and deposited on the surface of the filter-layers.

5. A filter for the purposes described comprising a sand or other granular layer, an inclosure for the same, an inlet for the incoming unfiltered water, perforated troughs or pipes communicating with said inlet, gates or valves to shut off communication between said inlet and perforated troughs, an artificial or inorganic filtering-membrane composed of asbestos or other fiber, pulp or asbestos powder, or powdered or pulverized coke, clinker or analogous material adapted to commingle with and be carried by the water and distributed and uniformly deposited over the filter-bed, and means communicating with said filter whereby the purified water may be drawn off.

6. A filter for the purposes described, comprising sand or other granular layers, an inclosure for the same, inlets for the incoming unfiltered water, perforated troughs or pipes communicating with said inlets and valves or gates to shut off communication therewith, an artificial or inorganic filter-membrane distributed on and evenly deposited over the surface of said filter, an outlet for the purified water and means connecting the filter with said outlet.

7. A filter for the purposes described comprising sand or other granular layers, an inclosure for the same, an inlet for the incoming unfiltered water, perforated troughs or pipes arranged above the filter-bed and communicating with said inlet, an outlet for the purified water, pipes communicating therewith and leading from the filter-bed, orifices between said outlet and the interior of the inclosure, gates or valves for said orifices, and an artificial or inorganic filtering-membrane distributed on and evenly deposited over the surface of the filter.

8. A filter for the purposes described, comprising sand or other granular layers, an inlet for the incoming unfiltered water, perforated troughs communicating with said inlet, an outlet-pipe for the purified water, pipes communicating with said outlet and leading from the filter, gates or valves for said pipes, orifices between said outlet and the filter-bed, gates or valves for said orifices, a filtering inorganic or artificial membrane for said filter and washout-pipes provided with orifices for the discharge of the filtering-membrane and accumulated sediment when cleansing the same.

9. A filter for the purposes described, comprising sand or other granular layers, an inlet and outlet for the unfiltered and filtered water, perforated troughs communicating with said inlets, pipes leading from the filter to said outlet, gates or valves for said pipes, orifices between said outlet and the perforated troughs and interior of the filter, gates or valves for said orifices, an inorganic or artificial filtering-membrane for said filter, washout-pipes having orifices therein for the discharge of the filtering-membrane and impurities, and gates or valves to cover said orifices.

10. In combination with a filter of the character described, a receptacle or reservoir for containing sterilizing liquids, pipe connections and controlling-valves between said receptacle or reservoir and filter, whereby the sterilizing liquids may be introduced into and withdrawn from one section of the filter, and means also communicating with said receptacle or reservoir, whereby the sterilizing liquids may be conveyed to other sections of the filter.

11. The combination with a filter of the character described, of a track or tracks arranged above the filter-bed and extending over the surface thereof and a hose-carriage adapted to travel on said track or tracks to force water under pressure upon the filtering-surface in sections.

JEAN AUGUSTE MAIGNEN.

Witnesses:
WM. C. WIEDERSHEIM,
E. HAYWARD FAIRBANKS.